Figure 1:
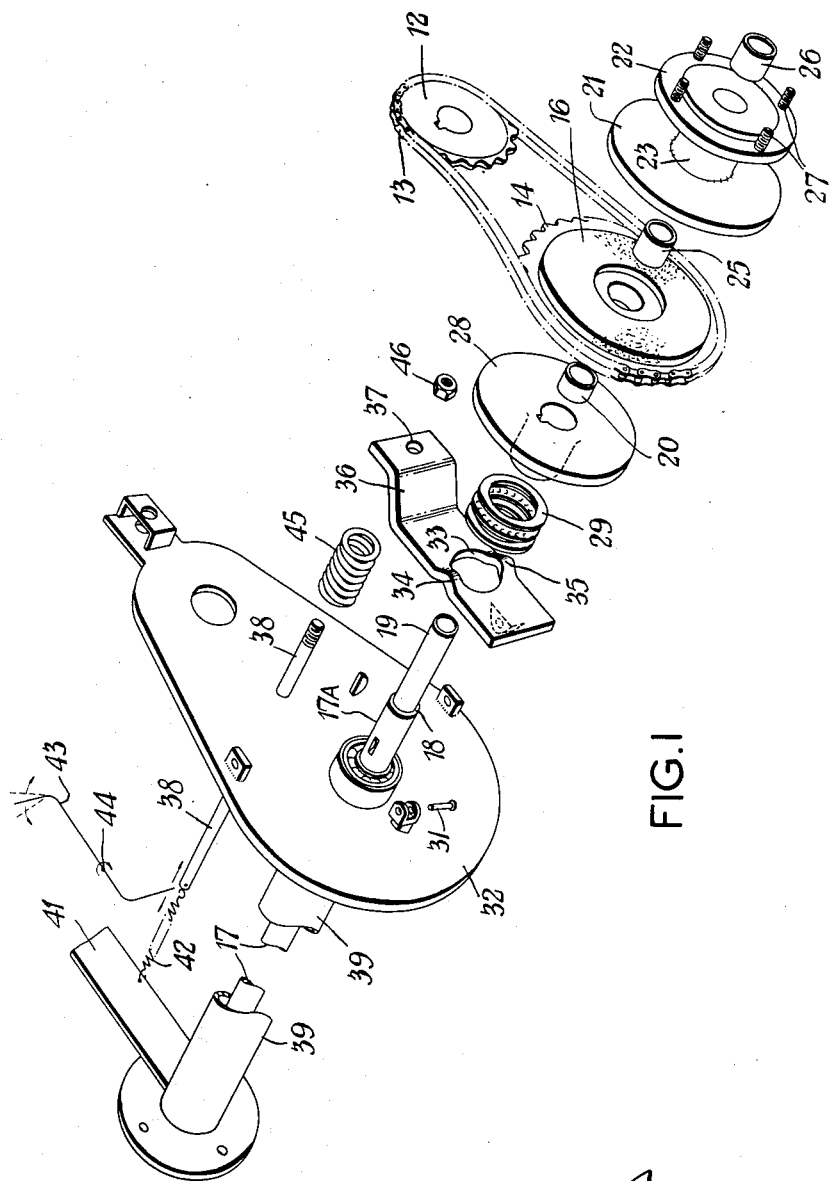

United States Patent Office 3,207,251
Patented Sept. 21, 1965

3,207,251
CLUTCH ARRANGEMENT IN A MOTOR DRIVEN STEERABLE MACHINE
Arthur Charles Putnam, Bishop's Stortford, and Philip George Harris, Harlow, England, assignors to Hayters Limited, Bishop's Stortford, England
Filed Dec. 19, 1963, Ser. No. 331,700
Claims priority, application Great Britain, Dec. 24, 1962, 48,564/62
3 Claims. (Cl. 180—76)

The present invention relates to an improved clutch such as may be used, for example, on a rotary type of grass cutter.

Known grass cutters of this kind may be equipped with one of two kinds of wheel drive. In the first the wheels are driven from a motor through a differential gear of a kind similar to those in use on the rear axle of an automobile. Such a gear is satisfactory in use in the sense that it permits the cutter to be steered as a result of relative rotation between the ground wheels, but is relatively expensive. In the second the wheels are driven through separate ratchets and this mechanism, although cheaper than the differential gear, has the disadvantage that the cutter cannot be steered easily, since this gear requires that at all times the two wheels rotate at the same speed.

It is an object of the present invention to provide a clutch which is no more expensive than the ratchet gear, and preferably cheaper, and which yet gives all the advantages of the differential gear.

With this end in view and in accordance with the invention, there is provided in a motor driven steerable horticultural machine such as a lawn mower, the combination of; a rotatable axle, a first wheel mounted on one end of the axle and rotatable relative thereto, a second wheel fixed to the other end of the axle, a double-sided clutch disc mounted on the axle for rotation and axial movement relative thereto, said clutch disc being operatively connected to the motor for rotation thereby, first and second clutch plates mounted on the shaft on respective sides of the disc, the first clutch plate being keyed to the shaft so as to be axially movable on, but drivably connected with the shaft, the second clutch plate being fixed to the first wheel, clutch-engaging means for yieldably forcing the first clutch plate axially against the disc thereby to force the disc axially against the second clutch plate and manually-operable means for disengaging the clutch, the manually-operable means being movable between two extreme positions in which the disc is fully engaged with the first and second clutch plates and fully disengaged therefrom respectively, and there being provided means for holding the said manually-operable means in an intermediate position thereof in which the disc is in slipping engagement with the first and second clutch plates.

Preferably the clutch engaging means comprises a pivotally mounted lever and a main spring urging the lever against the first clutch plate.

Preferably also the manually operable means comprises a linkage connected to the lever together with an auxiliary spring which is weaker than, and operates upon the linkage in opposition to, the main spring, the linkage being such that it may be locked in one position out of operative connection with the lever so that the main spring then exerts maximum force on the lever, may be left floating in another position so that the force exerted then on the lever is equal to the difference between the forces exerted by the two springs and may be locked in a third position in which it holds the lever, against the force of the main spring, away from the first clutch plate.

Figure 2:
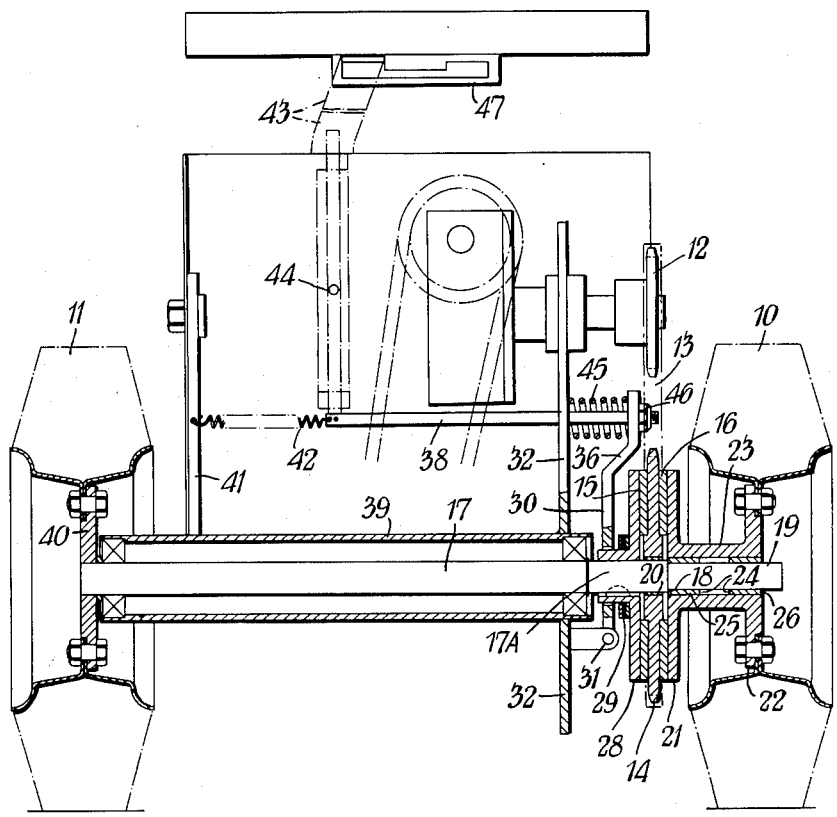

A preferred form of the invention will now be described with reference to the accompanying drawings, in which:

FIGURE 1 is a perspective, exploded view of the several parts of a clutch mechanism, and FIGURE 2 is a sectional elevation of the same mechanism, but showing the parts assembled.

It will be assumed that the clutch illustrated is to be used in a grass cutter of rotary type having its frame mounted on four wheels.

The front wheels are not driven, are freely rotatable on the frame and preferably are provided with means for adjustably raising the front end of the frame, together with the cutter, with respect to the wheels.

The cutter may be a plate mounted for rotation in a horizontal plane and carries several cutting blades. Mounted on the top of the frame is a motor serving to drive both the cutter and a pair of rear wheels shown at 10 and 11 in FIGURE 2. The drive for the rear wheels may be derived in any suitable way, with which the present invention is not concerned, but in any case serves to drive a sprocket 12 also shown in the drawings.

One purpose of the present invention is to provide, between the drive sprocket 12 and the wheels 10 and 11, a clutch with the aid of which the wheels may be rotated in any of the following ways:

(a) Positively at equal speeds and with no slip between the wheels.

(b) Positively but with a certain amount of slip, permitted when desired, so as to enable the machine to be steered to right or left.

(c) With the drive sprocket completely disengaged from the wheels, the machine then being propelled entirely by hand, and the wheels being then independent one of the other.

The drive from the sprocket 12 is taken by a chain 13 to a driven sprocket 14 on each face of which is an annular clutch lining or facing 15 or 16. The facings are similar in all respects.

Passing through the driven sprocket 14 is a wheel axle 17 stepped at 18 so as to have an end portion 19 of reduced diameter. At 20 is shown a sleeve bearing for the sprocket 14 which is mounted on the portion 17A of the axle.

Removably and rotatably secured on the reduced end 19 of the axle is an integral clutch plate 21 and wheel hub 22. These members are connected by a tubular member 23 internally stepped at 24 so as to receive a pair of sleeve-like bearings 25 and 26. The wheel 10 is secured on the hub 22 in the usual way with the aid of studs 27.

Also mounted on the portion 17A of the axle, but keyed to it, is a second clutch plate 28 which can be brought axially into co-operation with the clutch facing 15.

Behind the clutch plate 28 is a needle thrust bearing 29 and behind this bearing is a thrust lever 30 pivoted on a pin 31 which is mounted on a carrier plate 32. The thrust lever 30 is formed with a clearance hole 33 and with a pair of roughly cylindrical cam surfaces 34, 35 the common axis of which is parallel to the axis of pivoting of the thrust lever 30. The lever is also cranked at 36 and in its end is formed with a clearance hole 37 for a clutch operating rod 38.

The axle 17 is mounted for rotation in a housing 39 supported in part by the carrier plate 32. Fixed to the outer end of the axle housing 39 is a hub 40 carrying the wheel 11. Secured to the axle housing 39 is an arm 41 to which is anchored one end of an auxiliary clutch spring 42, the other end being secured to the rear end of the clutch operating rod 38.

Linked with the rod 38 is a clutch operating handle 43 pivoted at a point 44 intermediate its length.

The rod 38 passes through a bearing hole in the carrier plate 32 and at its forward end is encircled by a main clutch-spring 45. The extreme end of the rod 38 is threaded to receive a nut 46 which serves as a stop bearing against the thrust lever 30.

When the parts have been assembled into the positions shown in FIGURE 2 a chaincase cover is secured to the carrier plate 32.

The operation of the mechanism is as follows:

It will be appreciated that the clutch facings 15, 16 can be pinched between the clutch plates 28, 21 if these be forced hard together, and that when this happens a positive drive is taken to the two wheels. Similarly if the two clutch plates be forced lightly together the clutch facings are pinched only lightly and there is then provided a positive drive which can be made to slip, on either side of the sprocket 14, if sufficient drag is applied to one of the wheels; in this way the machine can be steered whilst being driven. Hereinafter this kind of drive is called a "slipping drive." Lastly if the two clutch plates are free of the clutch facings no drive is taken to the wheels which are then entirely free of the clutch plates and are independent of each other.

The handle 43 is movable in a gate 47 (FIGURE 2) having notches for the handle at two opposite extreme positions. In one of these positions the handle serves to hold the operating rod 38 in an extreme leftward position with respect to the figures. In this position the thrust lever 30 is pivoted, about the pin 31, to the left and pressure is relieved from the clutch plate 28. The clutch facings are thus in the free position and no drive is taken to either of the wheels, i.e. the clutch is fully disengaged. Simultaneously tension in the auxiliary spring 42 is more or less fully relieved whilst the main spring 45 is compressed between the thrust lever 30 and the carrier plate 32.

When the handle 43 is moved to, and held in, its opposite extreme position, the rod 38 is moved to the right to an extent such that the nut 46 is moved clear of the lever 30. The main clutch spring 45 is thus able to exert its maximum force to pivot the thrust lever 30 to the right. In this way both clutch facings are pinched hard between the clutch plates 28 and 21 and positive and equal drives are carried to the two wheels, i.e. the clutch is fully engaged. In this state it is impossible, by normal manual means, to make one wheel rotate at a different speed from the other, so that the machine cannot be steered.

If however the handle 43 be placed in, or is allowed to float in, a third position which is intermediate the two extreme positions, then the rod 38, and hence the thrust lever 30, are also in intermediate positions. In this state the clutch facings are pinched relatively lightly between the two clutch plates, with a strength which is sufficient to provide a positive drive to the two wheels, and is yet one which can be normally overcome when necessary.

Thus if the machine be stopped slip occurs on both sides of the clutch, whereas if the machine be steered to right or left drive is maintained on one side whilst slip occurs on the other.

What we claim is:

1. In a motor-driven steerable horticultural machine such as a lawn mower, the combination of; a rotatable axle, a first wheel mounted on one end of the axle and rotatable relative thereto, a second wheel fixed to the other end of the axle, a double-sided clutch disc mounted on the axle for rotation and axial movement relative thereto, said clutch disc being operatively connected to the motor for rotation thereby, first and second clutch plates mounted on the shaft on respective sides of the disc, the first clutch plate being keyed to the shaft so as to be axially movable on, but drivably connected with the shaft, the second clutch plate being fixed to the first wheel, clutch-engaging means for yieldably forcing the first clutch plate axially against the disc thereby to force the disc axially against the second clutch plate and manually-operable means for disengaging the clutch, the manually-operable means being movable between two extreme positions in which the disc is fully engaged with the first and second clutch plates and fully disengaged therefrom respectively, and there being provided means for holding the said manually-operable means in an intermediate position thereof in which the disc is in slipping engagement with the first and second clutch plates.

2. A machine as claimed in claim 1 wherein the said clutch engaging means comprises a pivotally mounted lever and a main spring urging the lever against the first clutch plate.

3. A machine as claimed in claim 1, wherein the said clutch-engaging means comprises a pivotally mounted lever together with a main spring urging the lever against the first clutch plate and the manually-operable means comprises a linkage connected to the lever together with an auxiliary spring which is weaker than, and operates upon the linkage in opposition to, the main spring, the linkage being such that it may be locked in one position out of operative connection with the lever so that the main spring then exerts maximum force on the lever, may be left floating in another position so that the force exerted then on the lever is equal to the difference between the forces exerted by the two springs and may be locked in a third position in which it holds the lever, against the force of the main spring, away from the first clutch plate.

References Cited by the Examiner

UNITED STATES PATENTS

| | | |
|---|---|---|
| 728,420 | 5/03 | De Simone. |
| 1,211,538 | 1/17 | Burtt. |
| 1,368,856 | 2/21 | Stephens et al. _____ 192—49 |

A. HARRY LEVY, *Primary Examiner.*